United States Patent
Kang et al.

(10) Patent No.: US 8,562,312 B2
(45) Date of Patent: Oct. 22, 2013

(54) LINEAR MOTOR AND RECIPROCATING COMPRESSOR EMPLOYING THE SAME

(75) Inventors: Yang-Jun Kang, Changwon-shi (KR); Chan-Gab Park, Changsown-shi (KR); Young-Hoan Jeon, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 468 days.

(21) Appl. No.: 12/740,402

(22) PCT Filed: Jun. 16, 2008

(86) PCT No.: PCT/KR2008/003392
§ 371 (c)(1),
(2), (4) Date: Nov. 19, 2010

(87) PCT Pub. No.: WO2009/057873
PCT Pub. Date: May 7, 2009

(65) Prior Publication Data
US 2011/0058964 A1    Mar. 10, 2011

(51) Int. Cl.
*F04B 35/04*    (2006.01)
*F04B 17/04*    (2006.01)
*H02K 41/02*    (2006.01)

(52) U.S. Cl.
USPC .................................... 417/417; 310/12.01

(58) Field of Classification Search
USPC ............... 417/45, 415, 416, 417, 418, 481; 310/12.01, 12.15, 12.17, 15, 36
See application file for complete search history.

(56) References Cited

U.S. PATENT DOCUMENTS

| | | | |
|---|---|---|---|
| 3,134,938 A | 5/1964 | Morgan | |
| 4,424,438 A | 1/1984 | Antelman et al. | |
| 4,737,695 A | 4/1988 | Kim | |
| 5,233,280 A | 8/1993 | Ghosh | |
| 2003/0102763 A1 | 6/2003 | Park | |
| 2005/0189824 A1* | 9/2005 | Jeong et al. | 310/15 |
| 2006/0119302 A1* | 6/2006 | Yang et al. | 318/434 |
| 2006/0120891 A1 | 6/2006 | Jung et al. | |
| 2006/0251529 A1* | 11/2006 | Kim | 417/417 |

FOREIGN PATENT DOCUMENTS

| | | |
|---|---|---|
| CH | 262884 | 10/1947 |
| CH | 262884 | * 10/1949 |
| CN | 1714242 | 12/2005 |
| EP | 1 553 685 A2 | 7/2005 |
| FR | 2 325 237 | 9/1975 |
| FR | 2325237 | * 9/1975 |
| JP | 10-189275 | 7/1998 |
| JP | 2001-169524 | * 6/2001 |
| KR | 10-2006-0025108 | 3/2006 |

OTHER PUBLICATIONS

Extended European Search Report for Application 08766354.8 dated Sep. 8, 2011.
Chinese Office Action dated Aug. 24, 2012 for Application 200880114308.1 and English language translation.
Korean Office Action for Application 10-2007-0109819 dated Jul. 22, 2013.

* cited by examiner

*Primary Examiner* — Devon Kramer
*Assistant Examiner* — Bryan Lettman
(74) *Attorney, Agent, or Firm* — KED & Associates LLP

(57) ABSTRACT

A linear motor for generating a linear reciprocating motion force, and a reciprocating compressor for compressing a refrigerant by employing the linear motor. The linear motor and the reciprocating compressor employing the same can reduce the number of inverter switches by employing a coil unit whose winding method is improved and a power supply apparatus whose connection to the coil unit and other circuits are improved, and can make it easy to control and reduce production costs by simplifying the circuit configuration.

15 Claims, 3 Drawing Sheets

LINEAR MOTOR AND RECIPROCATING COMPRESSOR EMPLOYING THE SAME

TECHNICAL FIELD

The present invention relates to a linear motor, which generates a linear reciprocating motion force, and a reciprocating compressor employing the linear motor, and more particularly, to a linear motor, which can reduce the number of inverter switches by the improvement of a power supply apparatus and a coil unit, and hence can reduce costs and makes it easy to control, and a reciprocating compressor employing the same.

BACKGROUND ART

In general, a compressor is a mechanical apparatus for compressing a refrigerant or other various operation gases and raising a pressure thereof, by receiving power from a power generation apparatus such as an electric motor or turbine. The compressor has been widely used for an electric home appliance such as a refrigerator and an air conditioner, or in the whole industry.

The compressors are roughly classified into a reciprocating compressor in which a compression space for sucking or discharging an operation gas is formed between a piston and a cylinder, and the piston is linearly reciprocated inside the cylinder, for compressing a refrigerant, a rotary compressor in which a compression space for sucking or discharging an operation gas is formed between an eccentrically-rotated roller and a cylinder, and the roller is eccentrically rotated along the inner wall of the cylinder, for compressing a refrigerant, and a scroll compressor in which a compression space for sucking or discharging an operation gas is formed between an orbiting scroll and a fixed scroll, and the orbiting scroll is rotated along the fixed scroll, for compressing a refrigerant.

Recently, a linear compressor has been developed among the reciprocating compressors. In the linear compressor, a piston is coupled directly to a linearly-reciprocated driving motor to prevent a mechanical loss by motion conversion, improve the compression efficiency and simplify the configuration.

FIG. 1 is a view illustrating a conventional power supply apparatus applied to a reciprocating compressor. A DC power supply unit V for rectifying a household or industrial alternating current power (not shown) into a direct current is provided, and a control unit (not shown) controls inverter switches S1-S4 in pulse width modulation (PWM) type to supply an alternating current Vm to a linear motor. The DC power supply unit V has a rectifying section for rectifying an AC power and a DC link section, which is a typical construction, so that illustration and description thereof are omitted. The DC power passed through the rectifying section (not shown) and the DC link section (not shown) is changed into an AC power (Vm) having an appropriate amplitude and frequency by the ON/OFF operation of the inverter switches S1-S4, and this AC power (Vm) is applied to the linear motor (precisely, a coil of the linear motor).

Since such a conventional power supply apparatus should employ four inverter switches in order to apply an AC power to the linear motor, the on/off control of the four inverter switches and the circuit configuration are considerably complicated, and the inverter switches have a different reaction time. Hence, there is a probability that a desired AC power may not be applied to the linear motor. In addition, there is a problem that manufacturing costs rises by the application of a plurality of inverter switches.

DISCLOSURE OF INVENTION

Technical Problem

Accordingly, it is an object of the present invention to provide a linear motor including a power supply apparatus with a reduced number of switches of an inverter switch unit and a coil unit whose winding and connection to a circuit are improved, and a reciprocating compressor employing the same.

It is another object of the present invention to provide a linear motor, which can supply a desired AC power even if the number of required inverter switches is reduced, and a reciprocating compressor employing the same.

It is still another object of the present invention to provide a linear motor, which makes it easy to control an inverter switch unit and simplifies the circuit configuration, and a reciprocating compressor employing the same.

Technical Solution

According to one aspect of the invention, in order to achieve the objects as described above, there is provided a linear motor, comprising: an inner stator formed by laminating a plurality of laminations in the circumferential direction; an outer stator disposed outside the inner stator at a predetermined interval, and formed by laminating a plurality of laminations in the circumferential direction; a coil winding body comprised of first and second coil units divided in the radial direction, for generating an electromagnetic force between the inner stator and the outer stator; and a permanent magnet disposed at the gap between the inner stator and the outer stator and interacting with the electromagnetic force of the coil winding body.

Further, in the present invention, the winding directions of the first and second coil units are opposite to each other.

Further, in the present invention, the first and second units are connected to each other.

Further, in the present invention, the linear motor further includes a power supply apparatus having a rectifying section for rectifying an AC voltage supplied from an AC power supply unit, the power supply unit being connected to the coil winding body to supply the AC voltage.

Further, in the present invention, a connecting point of the first and second coil units is grounded.

Further, in the present invention, the power supply apparatus further includes an inverter switch unit in which a first switch for applying power to the first coil unit and a second switch for applying power to the second coil unit are connected in parallel.

Further, in the present invention, the power supply apparatus further includes a DC link section for stabilizing the amplitude of the voltage rectified in the rectifying section, the DC link section being connected to the inverter switch unit.

Further, in the present invention, the first and second switches are alternately turned on or off.

Further, in the present invention, at least one of the first and second switches is in the off state.

Further, in the present invention, the linear motor further includes a first capacitor connected in parallel to the first coil unit and a second capacitor connected in parallel to the second coil unit.

According to another aspect of the invention, in order to achieve the objects as described above, there is provided a reciprocating compressor, comprising: a cylinder having a compression space; a piston linearly reciprocating within the cylinder to suck, compress and discharge refrigerant in the compression space; a permanent magnet connected to the piston; a coil unit for generating an electromagnetic force for linearly reciprocating the piston by interactions with the permanent magnet, and having first and second coil units connected in parallel; and an inverter switch unit for supplying power to the coil unit, and including a first switch for applying power to the first coil unit and a second switch for applying power to the second coil unit that are connected in parallel.

Further, in the present invention, the winding directions of the first and second coil units are opposite to each other.

Further, in the present invention, the first and second units are connected to each other, and a connecting point of the first and second coil units is grounded.

Further, in the present invention, the first and second coil units are connected in parallel to first and second capacitors, respectively.

Further, in the present invention, the first and second switches are alternately turned on or off.

Further, in the present invention, when the first switch is turned on and the second switch is turned off in a state that power is supplied, the piston moves to the bottom dead center from the top dead center to thus sequentially implement an expansion stroke and a suction stroke in the compression space.

Further, in the present invention, when the first switch is turned off and the second switch is turned on in a state that power is supplied, the piston moves to the top dead center from the bottom dead center to thus sequentially implement a compression stroke and a discharge stroke in the compression space.

Further, in the present invention, at least one of the first and second switches in the off state.

Further, in the present invention, the power supply apparatus includes a rectifying section for rectifying an AC voltage supplied from an AC power supply unit.

Further, in the present invention, the power supply apparatus further includes a DC link section for stabilizing the amplitude of the voltage rectified in the rectifying section, the DC link section being connected to the inverter switch unit.

BEST MODE FOR CARRYING OUT THE INVENTION

Hereinafter, the present invention will be described in detail based on an embodiment of the present invention and the accompanying drawings.

Figure 1:
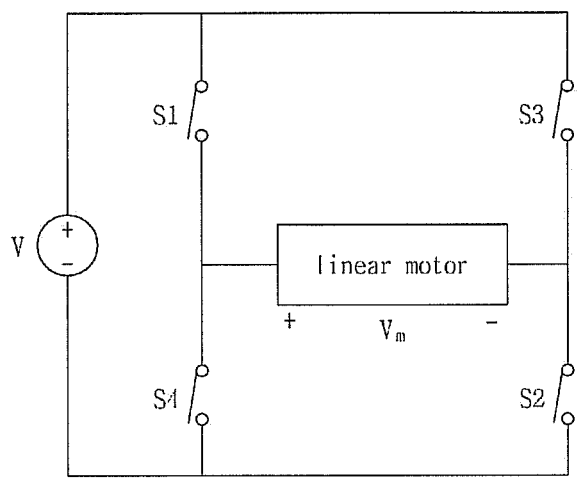
FIG. 1 is a view illustrating a conventional power supply apparatus applied to a reciprocating compressor.
Figure 2:
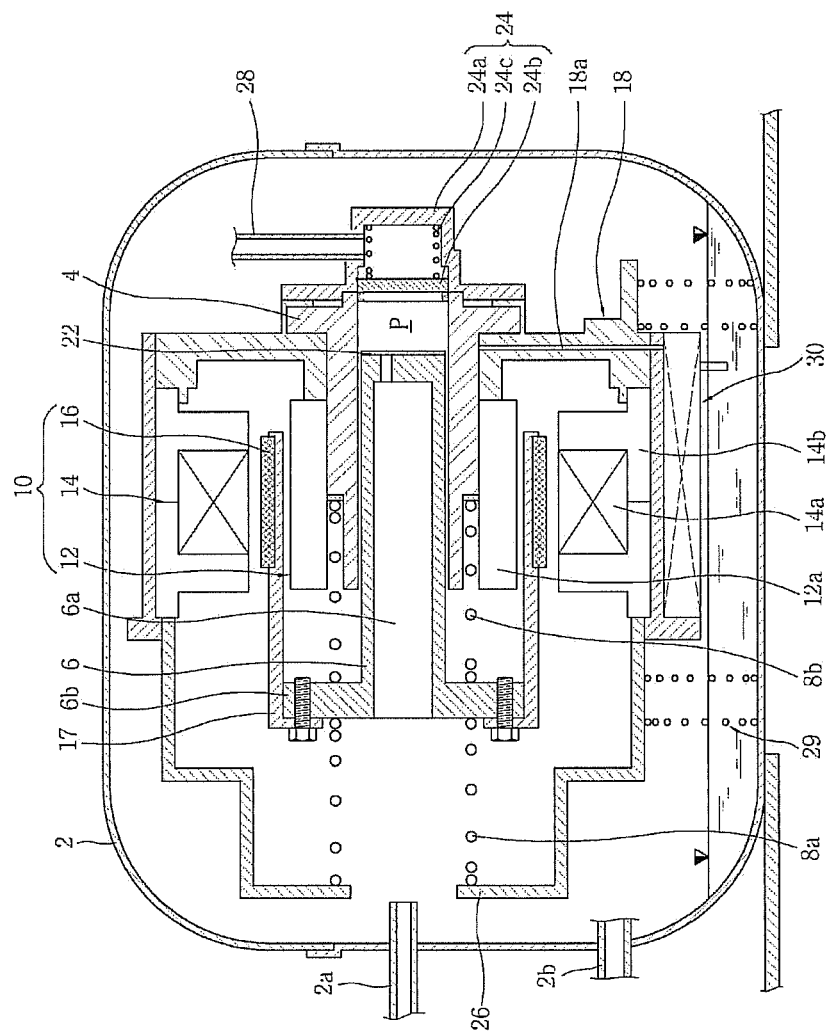
FIG. 2 is a cross sectional view of a reciprocating compressor to which a power supply apparatus is to be applied in accordance with the present invention.

FIG. 2 is a cross sectional view of a reciprocating compressor to which a power supply apparatus is to be applied in accordance with the present invention.

In the reciprocating compressor of FIG. 2, an inflow tube 2a and an outflow tube 2b for sucking and discharging refrigerants are installed at one side of a hermetic container 2, a cylinder 4 is fixedly installed in the hermetic container 2, a piston 6 is linearly reciprocated in the cylinder 4, for compressing the refrigerants sucked into a compression space P in the cylinder 4, and various springs elastically support the piston 6 in its motion direction. The piston 6 is connected to a linear motor 10 for generating a linear reciprocation driving force.

A suction valve 22 is installed at one end of the piston 6 contacting the compression space P. A discharge valve assembly 24 is installed at one end of the cylinder 4 contacting the compression space P. The suction valve 22 and the discharge valve assembly 24 are automatically opened and closed according to an inner pressure of the compression space P, respectively.

The hermetic container 2 is installed by hermetically coupling upper and lower shells. The inflow tube 2a for sucking the refrigerants and the outflow tube 2b for discharging the refrigerants are installed at one side of the hermetic container 2. The piston 6 is elastically supported in its motion direction inside the cylinder 4 for linear reciprocation, and the linear motor 10 is coupled to a frame 18 outside the cylinder 4, thereby forming an assembly. This assembly is elastically supported on the inner bottom surface of the hermetic container 2 by support springs 29.

A predetermined amount of oil is filled on the inner bottom surface of the hermetic container 2. An oil pumping device 30 for pumping the oil is installed at the bottom end of the assembly. An oil supply tube 18a is formed in the frame 18 disposed at the lower portion of the assembly, for supplying the oil to the gap between the piston 6 and the cylinder 4. The oil supply device 30 is operated by vibration generated by the linear reciprocation of the piston 6, for pumping the oil. The oil is supplied to the gap between the piston 6 and the cylinder 4 through the oil supply tube 18a, for performing cooling and lubrication.

The cylinder 4 is formed in a hollow shape, so that the piston 6 can be linearly reciprocated in the cylinder 4. The compression space P is formed in one side of the cylinder 4. In a state where one end of the cylinder 4 approaches the inner portion of the inflow tube 2a, the cylinder 4 is preferably installed on the same straight line with the inflow tube 2a. The piston 6 is installed inside one end of the cylinder 4 nearby the inflow tube 2a for linear reciprocation. The discharge valve assembly 24 is installed at the other end of the cylinder 4 opposite to the inflow tube 2a.

The discharge valve assembly 24 includes a discharge cover 24a installed at the end of the cylinder 4, for forming a discharge space, a discharge valve 24b for opening and closing the end of the cylinder 4 nearby the compression space P, and a valve spring 24c, which is a kind of coil spring, for applying an elastic force in the axial direction between the discharge cover 24a and the discharge valve 24b. An O-ring is inserted onto the inner circumference of the end of the cylinder 4, so that the discharge valve 24a can be closely adhered to the end of the cylinder 4.

A loop pipe 28 is curvedly installed between one side of the discharge cover 24a and the outflow tube 2b. The loop pipe 28 guides the compressed refrigerants to be externally discharged, and buffers the vibration generated by the interactions of the cylinder 4, the piston 6 and the linear motor 10 and transferred to the whole hermetic container 2.

When the piston 6 is linearly reciprocated in the cylinder 4, if a pressure of the compression space P is over a predetermined discharge pressure, the valve spring 24c is compressed to open the discharge valve 24b. After the refrigerants are discharged from the compression space P, the refrigerants are completely externally discharged through the loop pipe 28 and the outflow tube 2b.

A refrigerant passage 6a is formed at the center portion of the piston 6, so that the refrigerants sucked through the inflow tube 2a can pass through the refrigerant passage 6a. The linear motor 10 is connected directly to one end of the piston 6 nearby the inflow tube 2a by a connection member 17, and the suction valve 22 is installed at the other end of the piston 6 opposite to the inflow tube 2a. The piston 6 is elastically supported in its motion direction by various springs.

The suction valve 22 is formed in a thin plate shape with its center portion partially cut to open and close the refrigerant passage 6a of the piston 6. One side of the suction valve 22 is fixed to the end of the piston 6 by using screws.

Accordingly, when the piston 6 is linearly reciprocated inside the cylinder 4, if the pressure of the compression space P is below a predetermined suction pressure lower than the discharge pressure, the suction valve 22 is opened and the refrigerants are supplied into the compression space P, and if the pressure of the compression space P is over the predetermined suction pressure, the suction valve 22 is closed and the refrigerants are compressed in the compression space P.

Especially, the piston 6 is elastically supported in its motion direction. In detail, a piston flange 6b radially protruded from the end of the piston 6 nearby the inflow tube 2a is elastically supported in the motion direction of the piston 6 by mechanical springs 8a and 8b such as coil springs. In addition, the refrigerants filled in the compression space P in the opposite direction to the inflow tube 2a are operated as a gas spring by a self elastic force, for elastically supporting the piston 6.

The mechanical springs 8a and 8b have a constant mechanical spring constant Km regardless of a load. Preferably, the mechanical springs 8a and 8b are installed at a support frame 26 fixed to the linear motor 10 and the cylinder 4, respectively, in the axial direction with the piston flange 6b therebetween. The mechanical springs 8a supported on the support frame 26 and the mechanical springs 8b installed in the cylinder 4 have the same mechanical spring constant Km.

Next, the linear motor 10 includes an inner stator 12 formed by laminating a plurality of laminations 12a in the circumferential direction, and fixed to the outer portion of the cylinder 4 by the frame 18, an outer stator 14 formed by laminating a plurality of laminations 14b in the circumferential direction around a coil winding body 14a formed by winding a coil, and installed at the outer portion of the cylinder 4 by the frame 18 with a predetermined gap from the inner stator 12, and a permanent magnet 16 disposed at the gap between the inner stator 12 and the outer stator 14, and connected to the piston 6 by the connection member 17. The coil winding body 14a can be fixed to the outer portion of the inner stator 12.

In the linear motor 10, when a current is applied to the coil winding body 14a to generate an electromagnetic force, the permanent magnet 16 is linearly reciprocated by interactions between the electromagnetic force and a magnetic force of the permanent magnet 16, and the piston 6 connected to the permanent magnet 16 is linearly reciprocated inside the cylinder 4.

Figure 3:
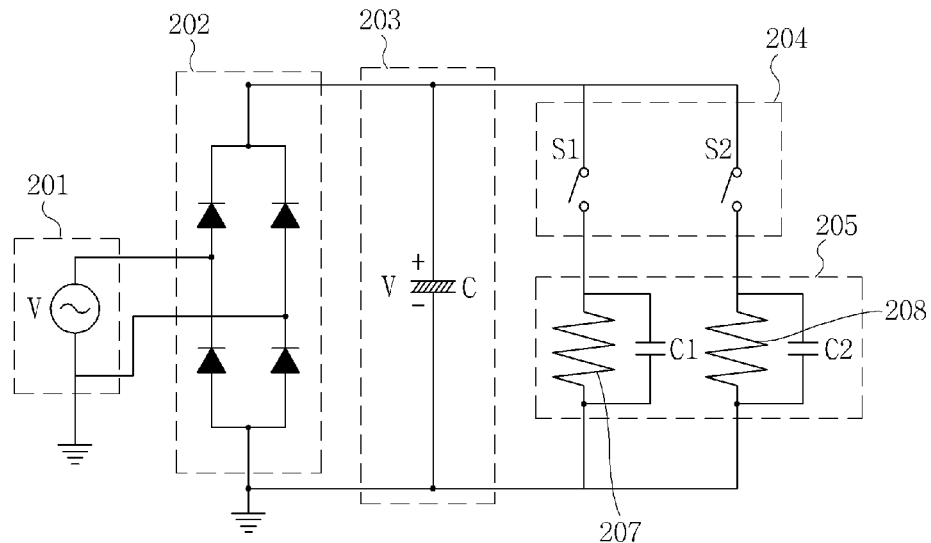
FIG. 3 is a configuration view of a power supply apparatus and a coil unit applied to the reciprocating compressor of FIG. 2.

FIG. 3 is a configuration view of a power supply apparatus and a coil unit applied to the reciprocating compressor of FIG. 2.

In FIG. 3, the power supply apparatus includes a rectifying section 202 for rectifying an AC power supplied from an AC power supply unit 201 to make the AC power flow in only one direction, a DC link section 203 for stabilizing the power rectified in the rectifying section 202, and an inverter switch unit 204 for converting the DC power stabilized in the DC link section 203 into an AC power having an appropriate amplitude and frequency and applying it to a coil unit 205. The AC power is typically supplied from the outside through the AC power supply unit 201, such as power wires, cables, etc. Since the purpose of the rectifying section 202 and DC link section 203 is to convert an AC power into a stable DC power, the two sections can be combined into a power conversion unit.

Figure 4:
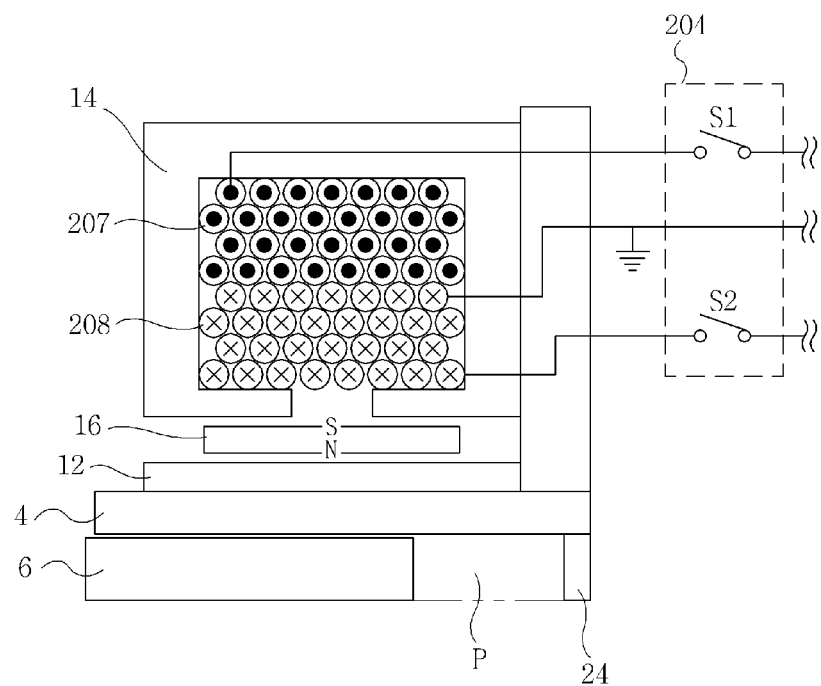
FIG. 4 is a partial cross sectional view of the reciprocating compressor of FIG. 2.

The power passed through the power supply apparatus is applied to the coil unit 205. In the circuit diagram of FIG. 3, the coil unit 205 is split into two coils 207 and 208, which is equivalent to the coil winding body 14a as shown in FIG. 2 and equivalent to the first and second coil units 207 and 208 laminated in the diameter direction (or radial direction) within the outer stator 14 as shown in FIG. 4. The first and second coil units 207 and 208 are opposite to each other only in the winding direction and are connected to each other.

Although the rectifying section 202 functions to rectify an AC power so as to flow in only one direction, and, in FIG. 3, is composed by connecting diodes in a full-bridge configuration, the configuration of the rectifying section is a well-known art, and therefore, anything that functions to rectify an AC power so as to flow in only one direction is available.

The DC link section 203 functions to stabilize the amplitude of the rectified power. As shown in FIG. 3, if rectification is implemented by connecting diodes in a full-bridge configuration, even though power is applied in only one direction but the amplitude thereof is part of a sine wave, thereby resulting in serious fluctuations. In order to reduce such fluctuations, the DC link section 203 is provided to stabilize power. For instance, the DC link section 203 is comprised of a capacitor C. The process for stabilizing power by the DC link section 203 is as follows. When an AC power is rectified, if the amplitude thereof is larger than a voltage of the capacitor C, the diodes are opened and therefore the voltage of the capacitor C becomes equal to a voltage of the rectified AC power. When an AC power is rectified, if the amplitude thereof is smaller than a voltage of the capacitor C, the diodes are not opened, and therefore the voltage of the capacitor C is maintained. If the capacitance of the capacitor C is large, the variation range of the amplitude of the voltage is small. By this process, the amplitude of the voltage can be stabilized.

The inverter switch unit 204 controls a supplied power through switches S1 and S2. Concretely, the first switch S1 and the second switch S2 control a power supplied to the first coil unit 207 and a power supplied to the second coil unit 208, respectively. One end of the first switch S1 is connected to the power conversion unit, and the other end of the first switch S1 is connected to the first coil unit 207. One end of the second switch S2 is connected to the power conversion unit, and the other end of the second switch S2 is connected to the second coil unit 208. That is, one end of the inverter switch unit 204 is connected to the rectifying section 202 and the DC link section 203, and the other end is split into two and connected to the first coil unit 207 and the second coil unit 208. The power controlled through the inverter switch unit 204 is converted into an AC power having an appropriate amplitude and frequency, and the AC power is applied to the coil unit 205.

The coil unit 205 includes the first coil unit 207 and the second coil unit 208, and forms a magnetic field upon receipt of an AC power. This magnetic field causes the permanent magnet (16 of FIG. 2) to receive a force, and this electromagnetic force causes the piston 6 to move. In this way, when the linear motor (10 of FIG. 2) moves by interactions between the electromagnetic force formed by a current and an external magnetic force, this motion causes the current to flow in the direction opposite to the current supplied from the outside. Due to this current, an electromagnetic force, i.e., a back EMF, acts in the direction opposite to the direction of moving the linear motor (10 of FIG. 2). Of course, because the back EMF acts in the direction opposite to the direction of moving the linear motor (10 of FIG. 2), this exerts a negative effect on the performance of the linear motor. Due to this back EMF, a mutual inductance is created between the first coil unit 207 and the second coil unit 208, and the mutual inductance affects a voltage applied to the coil unit 205, and an electromagnetic force is created in the coils to thereby reduce the efficiency of the motor. To attenuate the mutual inductance caused by the back EMF, the capacitors C1 and C2 are preferably connected to the first and second coil units 207 and 208 in parallel, respectively.

In controlling the inverter switch unit 204, a control unit (not shown) of the reciprocating compressor alternately turns on/off the first switch S1 and the second switch S2 to thus supply power from the DC link section 203 to the first coil unit 207 or second coil unit 208, whereby a suction stroke, compression stroke, discharge stroke, and re-expansion stroke of the reciprocating compressor are sequentially implemented. For instance, when the first switch S1 is in the ON state or in the ON operation and the second switch S2 is in the Off state or in the Off operation, a voltage V is applied to the first coil unit 207 to thus sequentially implement the re-expansion stroke and suction stroke, and when the first switch S1 is in the Off operation or in the Off state and the second switch S2 is in the ON operation or in the ON state, a voltage V is applied to the second coil unit 208 to thus sequentially implement the compression stroke and discharge stroke. Since the winding directions of the first coil unit 207 and second coil unit 208 are opposite to each other, they perform reverse operations to each other even if the same voltage V is applied.

FIG. 4 is a view showing the coil unit 205 used in the reciprocating compressor in accordance with the present invention.

In the reciprocating compressor, the outer stator 14 includes a first coil unit 207 and a second coil unit 208 whose coil winding directions are opposite to each other and which are connected to each other. In the above, it has been described that AC voltages applied to the first coil unit 207 and second coil unit 208 are controlled through the switches S1 and S2 of the inverter switch unit, respectively. FIG. 4 is a partial cross sectional view of the reciprocating compressor of FIG. 2, which is provided for additionally explaining the important portions of the present invention. The piston 6 and the permanent magnet 16 are moved together because the permanent magnet 16 and the piston 6 are installed to be connected by a connecting member (17 of FIG. 2), however, the illustration of the connecting member (17 of FIG. 2) will be omitted for explanation.

Figure 5:
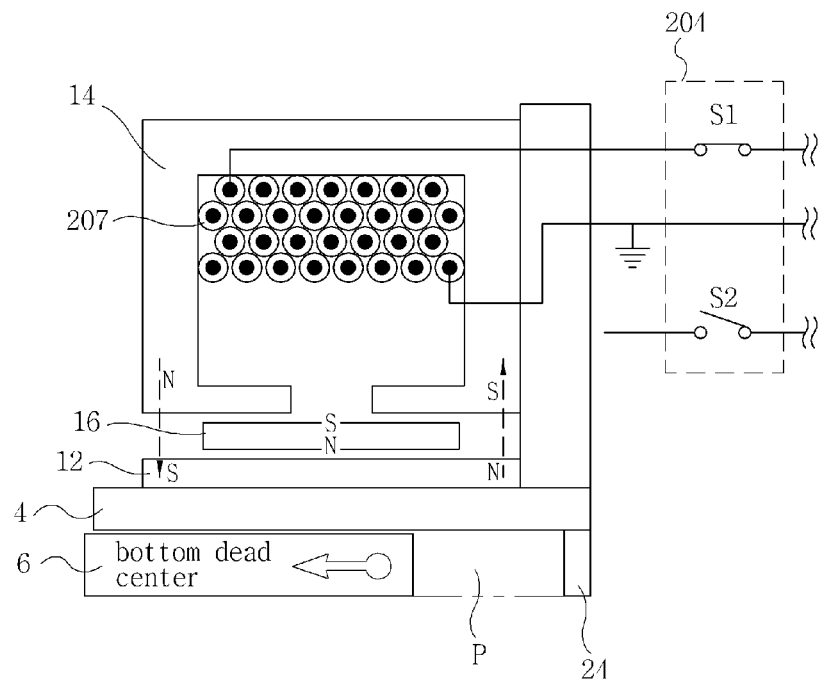
FIGS. 5 and 6 are partial cross sectional views illustrating the movement of the piston caused by the power supplied to the coil unit in the reciprocating compressor of FIG. 4.
Figure 6:
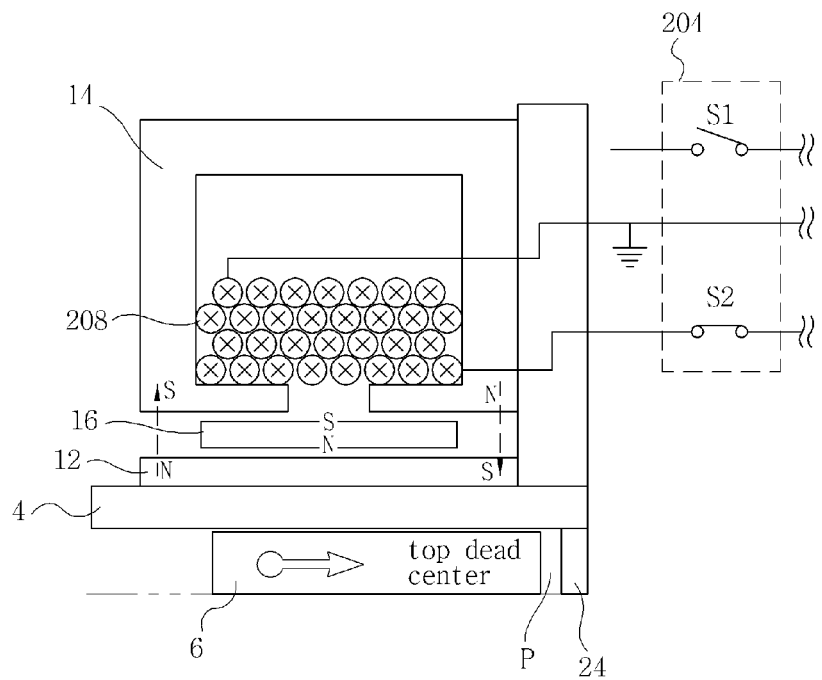

The first coil unit 207 and the second coil unit 208 are positioned inside and outside the outer stator 14, respectively, and these positions are maintained in FIGS. 5 and 6, too. That is, one end of the first coil unit 207 is connected to the first switch S1 and the other end is grounded, while one end of the second coil unit 208 is connected to the second switch S2 and the other end is grounded. When power is supplied to the coil unit 205 including the first coil unit 207 and the second coil unit 208, a magnetic field is formed, and the permanent magnet 16 is influenced by the magnetic field to thus generate an electromagnetic force, and the piston 6 moves by this force.

The compression space P is comprised of one surface of the piston 6, a side of the cylinder 4, and the discharge valve assembly 24. The movement of the piston 6 caused by the application of power to the coil unit 205 will be described below.

FIGS. 5 and 6 are partial cross sectional views illustrating the movement of the piston caused by the power supplied to the coil unit in the reciprocating compressor of FIG. 4. Although FIGS. 5 and 6 are illustrated in such a way that, as shown in FIG. 4, the permanent magnet is not moved since the permanent magnet 16 and the piston 6 are separated for description, this illustration is merely for explanatory purposes, and it is apparent as shown in FIG. 2 that the movement of the piston 6 and the movement of the permanent magnet 16 are done at the same time. In addition, the illustration of the first or second coil unit 207 or 208 through which no current flows will be omitted for explanation.

In FIGS. 5 and 6, it can be seen that power is alternately supplied to the first coil unit 207 and the second coil unit 208. Here, a point where one end of the piston 6 and one surface of the cylinder 4 forming the compression space P are the closest to each other is referred to as a top dead center (or top dead point), and a point where one end of the piston 6 and one surface of the cylinder 4 forming the compression space P are the furthest to each other is referred to as a bottom dead center (or bottom dead point).

FIG. 5 is a view for explaining the movement of the piston when power is applied only to the first coil unit 207 by the first switch S1 being turned on and the second switch S2 being turned off. The second coil unit 208 is not illustrated since no power is applied thereto, and forms no magnetic field at all.

When current flows through the first coil unit 207, a magnetic field is formed, and the magnetic field brings about an effect that the portion (left side) nearby the bottom dead center of the outer stator 14 becomes an N pole and the portion (right side) nearby the top dead center becomes an S pole. The neighboring inner stator 12 is composed of a ferromagnetic body, and is influenced by the magnetic field of the outer stator 14. Therefore, there occurs an effect that the portion (left side) nearby the bottom dead center of the inner stator 12 becomes the S pole and the portion (right side) nearby the top dead center becomes the N pole. As the outer stator 14 side of the permanent magnet 16 is the S pole, the piston 6 moves toward the bottom dead center, thereby sequentially implementing an expansion stroke and a suction stroke.

FIG. 6 is a view for explaining the movement of the piston when power is applied only to the second coil unit 208 by the first switch S1 being turned off and the second switch S2 being turned on. The first coil unit 207 is not illustrated since no power is applied thereto, and forms no magnetic field at all.

When current flows through the second coil unit 208, a magnetic field is formed, and the magnetic field brings about an effect that the portion (left side) nearby the bottom dead center of the outer stator 14 becomes an S pole and the portion (right side) nearby the top dead center becomes an N pole. Therefore, there occurs an effect that the portion (left side) nearby the bottom dead center of the inner stator 12 becomes the N pole and the portion (right side) nearby the top dead center becomes the S pole. As the outer stator 14 side of the permanent magnet 16 is the S pole, the piston 6 moves toward the top dead center, thereby sequentially implementing a compression stroke and a discharge stroke.

In the conventional reciprocating compressor, the winding direction of the coil is constant, and the piston 6 moves toward the top dead center and bottom dead center according to a change in the direction of current applied to the coil. In the present invention, the coil unit has the first coil unit 207 and second coil unit 208 whose winding directions are opposite to each other, and which are connected to each other, and current flows alternately so as to prevent the current from flowing in the first coil unit 207 and second coil unit 208 at the same time. The current in the first coil unit 207 flows in a constant direction only when the piston is moved toward the bottom dead center, and the current in the second coil unit 208 flows in a constant direction only when the piston is moved toward the top dead center. Hence, it is easy to control the direction of current because the directions of currents flowing in the first coil unit 207 and second coil unit 208 are not changed.

The present invention has been explained in detail on the basis of the embodiments and accompanying drawings of the present invention. However, it is recognized that the scope of the present invention should not be limited to these embodiments and drawings but to the claims as hereinafter recited.

Industrial Applicability

Accordingly, the present invention can be low in cost and easy to control by having a power supply apparatus with a reduced number of switches of an inverter switch unit.

Accordingly, the present invention can drive the reciprocating compressor by supplying a desired AC power to the linear motor even if the number of required inverter switches is reduced.

Furthermore, the present invention can make it easier to control the inverter switch unit and simplify the circuit configuration.

Furthermore, the present invention can achieve a stable operation by attenuating a mutual inductance created by a back EMF created when the inverter switches are turned on/off.

The invention claimed is:

1. A linear motor, comprising:
an inner stator formed by laminating a plurality of laminations in a circumferential direction;
an outer stator disposed outside the inner stator at a predetermined interval, and formed by laminating another plurality of laminations in the circumferential direction;
a coil winding body of the outer stator comprised of first and second coil units divided in a radial direction and connected in parallel, for generating an electromagnetic force between the inner stator and the outer stator, wherein winding directions of the first and second coil units are opposite to each other; and
a permanent magnet disposed at a gap between the inner stator and the outer stator and interacting with the electromagnetic force of the coil winding body.

2. The linear motor of claim 1, further includes a power supply apparatus having a rectifying section for rectifying an AC voltage supplied from an AC power supply unit, the power supply apparatus being connected to the coil winding body to supply the AC voltage.

3. The linear motor of claim 2, wherein a connecting point of the first and second coil units is grounded.

4. The linear motor of claim 2, wherein the power supply apparatus further includes an inverter switch unit in which a first switch for applying power to the first coil unit and a second switch for applying power to the second coil unit are connected in parallel, and
a first capacitor connected in parallel to the first coil unit and a second capacitor connected in parallel to the second coil unit.

5. The linear motor of claim 4, wherein the power supply apparatus further includes a DC link section for stabilizing the amplitude of the voltage rectified in the rectifying section, the DC link section being connected to the inverter switch unit.

6. The linear motor of claim 4, wherein the first and second switches are alternately turned on or off.

7. The linear motor of claim 4, wherein at least one of the first and second switches is in the OFF state.

8. A reciprocating compressor, comprising:
a cylinder having a compression space;
a piston linearly reciprocating within the cylinder to suck, compress and discharge refrigerant in the compression space;
a permanent magnet connected to the piston;
a coil unit for generating an electromagnetic force for linearly reciprocating the piston by interactions with the permanent magnet, and having first and second coil units connected in parallel and divided in a radial direction; and
an inverter switch unit for supplying power to the coil units, and including a first switch for applying power to the first coil unit and a second switch for applying power to the second coil unit that are connected in parallel, wherein the winding directions of the first and second coil units are opposite to each other.

9. The reciprocating compressor of claim 8, wherein the first and second coil units are connected to each other, and a connecting point of the first and second coil units is grounded.

10. The reciprocating compressor of claim 8, wherein at least one of the first and second switches in an off state.

11. The reciprocating compressor of claim 8, wherein the power supply apparatus includes a rectifying section for rectifying an AC voltage supplied from an AC power supply unit.

12. The reciprocating compressor of claim 11, further including a power supply apparatus that includes a DC link section for stabilizing the amplitude of the voltage rectified in the rectifying section, the DC link section being connected to the inverter switch unit.

13. A reciprocating compressor, comprising:
a cylinder having a compression space;
a piston linearly reciprocating within the cylinder to suck, compress and discharge refrigerant in the compression space;
a permanent magnet connected to the piston;
a coil unit for generating an electromagnetic force for linearly reciprocating the piston by interactions with the permanent magnet, and having first and second coil units connected in parallel and divided in a radial direction, wherein winding directions of the first and second coil units are opposite to each other; and
an inverter switch unit for supplying power to the coil units, and including a first switch for applying power to the first coil unit and a second switch for applying power to the second coil unit that are connected in parallel, wherein the first and second coil units are connected in parallel to first and second capacitors, respectively.

14. The reciprocating compressor of claim 13, wherein the first and second switches are alternately turned on or off, and wherein, when the first switch is turned on and the second switch is turned off in a state that power is supplied, the piston moves to a bottom dead center from a top dead center to thus sequentially implement an expansion stroke and a suction stroke in the compression space.

15. The reciprocating compressor of claim 13, wherein the first and second switches are alternately turned on or off, and wherein, when the first switch is turned off and the second switch is turned on in a state that power is supplied, the piston moves to a top dead center from a bottom dead center to thus sequentially implement a compression stroke and a discharge stroke in the compression space.

* * * * *